United States Patent [19]

Englund et al.

[11] 3,869,598

[45] Mar. 4, 1975

[54] METHOD FOR READING A DATA RECORD AND A DEVICE FOR PERFORMING THE METHOD

[75] Inventors: Gosta R. Englund, Stockholm; Rune L. Myren, Spanga, both of Sweden

[73] Assignee: Svenska Dataregister AB, Solna, Sweden

[22] Filed: Apr. 9, 1973

[21] Appl. No.: 349,337

[30] Foreign Application Priority Data

Apr. 12, 1972 Sweden .............................. 4723/72

[52] U.S. Cl. ............... 235/61.11 R, 235/61.11 D, 235/61.11 E, 340/345, 250/568

[51] Int. Cl. .... G06k 7/08, G01n 21/30, G06k 7/14, G08c 13/00

[58] Field of Search . 235/61.7 B, 61.11 E, 61.11 D, 235/61.12 N, 61.11 R; 340/172.5, 146.3 K, 345; 250/568, 569, 570

[56] References Cited

UNITED STATES PATENTS

| | | | |
|---|---|---|---|
| 3,106,706 | 10/1963 | Kolanowski | 340/345 |
| 3,417,231 | 12/1968 | Stites | 235/61.11 E |
| 3,445,634 | 5/1969 | Lanes | 235/61.11 E |
| 3,654,618 | 4/1972 | Kanda | 340/172.5 |
| 3,671,722 | 6/1972 | Christie | 235/61.12 N |
| 3,673,389 | 6/1972 | Kapsambelis | 235/61.11 R |
| 3,700,858 | 10/1972 | Murthy | 235/61.11 E |
| 3,717,750 | 2/1973 | Gilberg | 235/61.11 E |
| 3,735,096 | 5/1973 | Knockeart | 235/61.11 E |

*Primary Examiner*—Daryl W. Cook
*Assistant Examiner*—Robert M. Kilgore
*Attorney, Agent, or Firm*—Norman Friedman; Robert F. Rotella

[57] ABSTRACT

A device for reading coded tags or labels which may be read by scanning in either direction utilizes a coded format including an edge code which functions both as a start code and as an indicator that the code is independent or dependent.

3 Claims, 5 Drawing Figures

METHOD FOR READING A DATA RECORD AND A DEVICE FOR PERFORMING THE METHOD

BACKGROUND OF THE INVENTION

The present invention relates to a system and method for reading a coded data record wherein several different codes may be used to represent the different data or characters to be sensed.

Within the retail business, for instance, price labels are nowadays used to a great extent. On these labels price, number, etc. of goods are recorded in code form and the labels are usually read by a magnetic or optical device. The code forms being used depend on the special field of use required for coded labels.

In U.S. Pat. No. 3,359,405, for example, there is shown an optically readable code where differently wide bars are arranged on different distances from each other. Also in Swedish patent No. 327,107 there is shown an optical readable code where equally wide black bars are arranged on different distances from each other. Various other codes, optical, as well as magnetically readable, are also described in the prior art literature.

When selecting a suitable code for a particular application, there are various objects to contend with. One object is that the character density whall be high. Another, is that when manufacturing the label with the code, the permissible printing tolerances shall be as great as possible in order to make the design of the printing device less expensive. A third object is, of course, that the code shall be capable of being read by a relatively simple reading device. Other objects or requisites are that the quality of the label material does not need to be first rate, and that only one color need be used in the printing process, etc.

In order to increase the character density, codes have been proposed where the individual characters are represented by bars and different distances between the bars. The bars and the distances therebetween designate in binary form, for instance, a figure, letter or the like, whereby any additional bar and/or distance is not needed between the individual characters in order that the reading shall be correctly performed. In such a code, for example, the first bar in a character can function as an end bar in the preceding character. When printing such a code on a label or similar record, the distances between the bars within the characters and the distances between the characters must be within certain predetermined tolerances in order that the information to be read may be properly decoded.

Some known printing devices are capable of printing the code with the required accuracy as to the distances between characters. Such printing devices use cliches, matrixes, etc., for instance, and can be so designed that all characters are arranged on one single type means, drum or the like.

Other printing devices, which often are more inexpensive, more easily settable and less bulky, and which consist of a settable type wheel for each single character can, of course, print the individual characters with approximately the same accuracy as the above mentioned printing devices. However, the distances between the characters will not be exact since the width of the type wheels varies in dependence of tolerances in the manufacturing process and also the wear of the surfaces of the wheels contacting each other which results from the repeated setting of the different type wheels.

To be able to use printing devices with individually settable and side by side arranged type wheels, a code has been proposed where the distances between the characters can vary without the correctness of the reading being influenced. Such a code will then get a lower character density depending on the fact that at least one additional bar for each character must be introduced in the code to delimit each character from the two adjacent characters. The price labels which are fastened to the goods can, in certain cases, be printed by a device of this kind, i.e. by a device with individual type wheels, which, depending on the advantages therewith, is used by personnel who, at a point of sale, i.e. in the shop, provide the labels with the printed code. In this case it is necessary that a code having independent characters be used, i.e. a code with a low character density. In other cases the labels can, for instance, be printed when the packages for the goods are manufactured and provided with other printed information. A cliche can easily be entered in the printing machine, this cliche being provided with the code which is to be used for the special article for which the package is intended. At this printing procedure, which does not necessitate any extra operation and is relatively inexpensive, a code with high character density can be used with advantage, i.e. a code where special distances between the individual characters are not needed.

Depending on the fact that the codes with, as well as without, special distances between the characters show essential advantages from an economic standpoint, it should be suitable to use one of these codes when the article is marked with a price or an article number at the same time as the package is being produced, and the other code when the articles are marked with prices or article numbers in the store. Since, very often there is a need to be able to mark the articles at the place where the packages are produced and to mark them in the store as well, two different codes would be needed. These codes must be read by two different reading devices or by a single reading device which is manually adjusted for reading each code. The disadvantages herewith are evident.

The present invention removes these disadvantages in a simple manner. On each label there is a mode of operation or edge code which, in addition to its function as a start code, informs the circuits in the reading device to read the code representing the price, article number, etc. that what is being read is an independent code (special distances between the characters) or as dependent code (no special distances between the characters).

The advantages with such a mode of operation or edge code is that any of two or more codes can be read by one single reading device; that no special means are necessary to adjust the reading device to read one code or the other; that it can function as a start code and also give an impulse to the circuits in the device to reverse the information represented by the code in the case where the reading direction is the reverse of the intended reading direction. In this case it is, of course, necessary that a mode of operation or edge code is arranged on each side of the code representing the characters.

The novel features which are considered to be characteristic of the invention are set forth with particularity in the appended claims. The invention itself, however, both as to its organization and method of operation, will best be understood from the following description when considered in connection with the accompanying drawings wherein:

DESCRIPTION OF AN ILLUSTRATIVE EMBODIMENT

Figure 1:
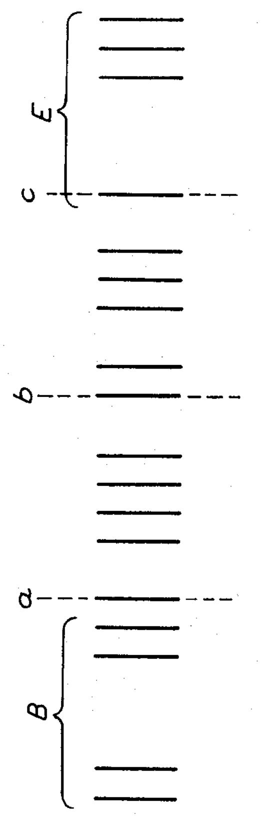
FIG. 1 shows a dependent bar code with two characters and a mode of operation code on each side of said bar code.

The code shown in FIG. 1 consists of equally wide bars with two different spaces therebetween and between the dashed lines *a* and *c*. Between lines *a* and *b* there is a character, which can represent a decimal one (1), and between lines *b* and *c* there is another character, which can represent a decimal two (2). As shown, the decimal one is represented by five bars and two greater spaces, and the decimal two is also represented by five bars and two greater spaces. All decimal digits are thus represented by five bars and two greater spaces whereby these spaces are placed on different locations in order to represent the different digits. The greater spaces designate binary 1's and the smaller spaces designate binary 0's. It is also evident from FIG. 1 that the code is not an independent code because the bar at the dashed line *b* does not only designate the end of the digit one but also designates the beginning of the digit two.

At the left of the dashed line *a* there is a mode of operation or edge code B. This code consists of four bars, two small spaces and one very great space twice as wide as any of the great spaces in the code representing the decimal digits. To the right of the dashed line *c* there is another mode of operation or edge code E consisting of four bars, two small spaces and one very great space twice as long as any of the great spaces in the code representing the decimal digits.

The mode of operation or edge codes B and E, which differ from any other code representing a character and which are independent on the adjacent code which represents a digit have several purposes. If reading is started from the left of the left mode of operation code B and is continued towards the right, this mode of operation code informs the circuits in the reading device that they (a) shall accept the information in the code after the mode of operation code, (b) that the reading is performed from the left to the right and (c) that said circuits shall process the binary code as a code not standing alone, i.e. as a dependent code. However, if the reading is performed from the right to the left, the mode of operation code E will get the same function as code B with the exception that the circuits are reversing the information in the code now being read backwards. When reading takes place from left to right, code E functions as an end code indicating that all information between codes B and E has been read, and in the case the reading is performed from right to left, code B functions as an end code. The different functions of codes B and E, of course, depend on the very large space being located in different places in these codes.

Figure 2:
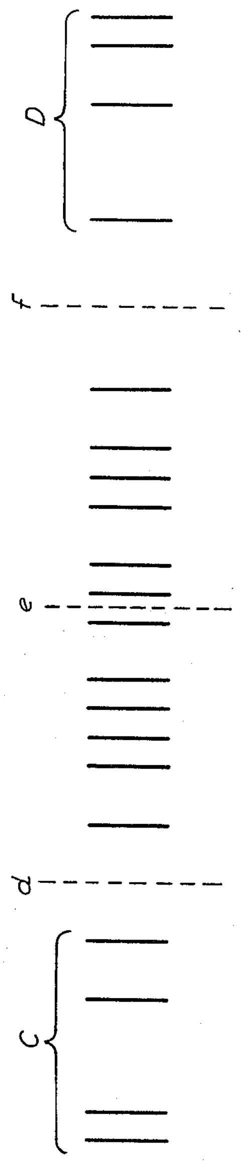
FIG. 2 shows an independent bar code with two characters and one mode of operation code on each side of said bar code.

The code shown in FIG. 2 is an independent code consisting of equally wide bars. The decimal digits one (1) and two (2) are represented between the dashed lines d, e and e, f, respectively and the mode of operation codes C and D are situated to the left of line g and to the right of line f, respectively. As is evident from the figure, the decimal one here consists of six bars and two large spaces between some of these bars. This is also the case with the decimal two and all other decimal digits which can be represented. The distances between the codes representing the decimal digits (between the two bars on each side of line (e) can hereby be varied from essentially the shortest distance between two bars in the code representing a digit to an endless distance without the accuracy of the reading being jeopardized. Mode of operation codes C and D, includes four bars, one small space, one medium space and one large space, and thus differs from the two mode of operation codes B and E, in FIG. 1, and has a function similar to the mode of operation codes B and E, i.e. they indicate the reading direction beginning and end, respectively, and that the code representing the characters in this case shall be read as an independent code. It is evident from FIG. 2 that the distance between each mode of operation code and adjacent code representing a decimal digit can vary virtually unlimited ($a + d$ and $f$). This is the case also for the code according to FIG. 1 ($a$ + $a$ and $c$).

Figure 3:
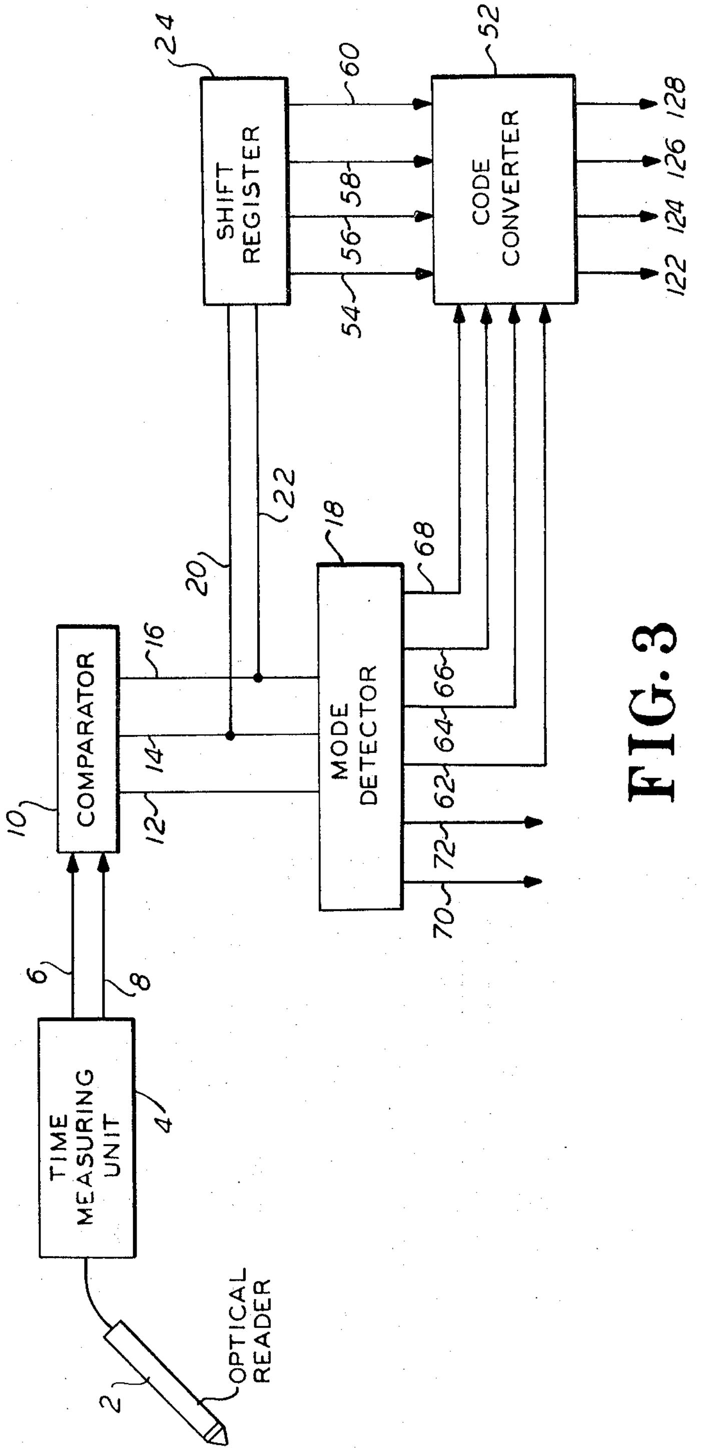
FIG. 3 shows a schematic block diagram of a system for reading the code according to FIG. 1 and the code according to FIG. 2 as well.

FIG. 3 is a schematic block diagram illustrating a system for reading the codes according to FIG. 1 and 2. An optical reader 2, which can be of a construction similar to the reader shown in U.S. Pat. No. 3,509,353 converts the essentially equally wide, black bars to essentially equally long negative pulses and while spaces therebetween are converted to positive pulses, the lengths of which correspond to the different spaces. The signals from reader 2 are sent to a time measuring unit 4 which measures two distances between the bars in the code following upon each other. The measurement is performed by a binary counter, for instance. The pulses representing these two distances are sent, via leads 6 and 8, to a comparator 10 where these pulses are compared with each other and coverted to bits. In the present example, they are converted to 0-bits, 1-bits and S-bits, where a 0-bit designates a short distance between two bars in the code, a 1-bit designates a distance approximately twice as long as said distance, and a S-bit designates a distance which is approximately four times as long as the shortest distance. The bit signals are sent to a mode of operation code detector 18 via leads 12, 14 and 16. The signals representing 0-bits and 1-bits are also sent to a shift register 24 via leads 20 (1-bits) and 22 (0-bits).

Figure 4:
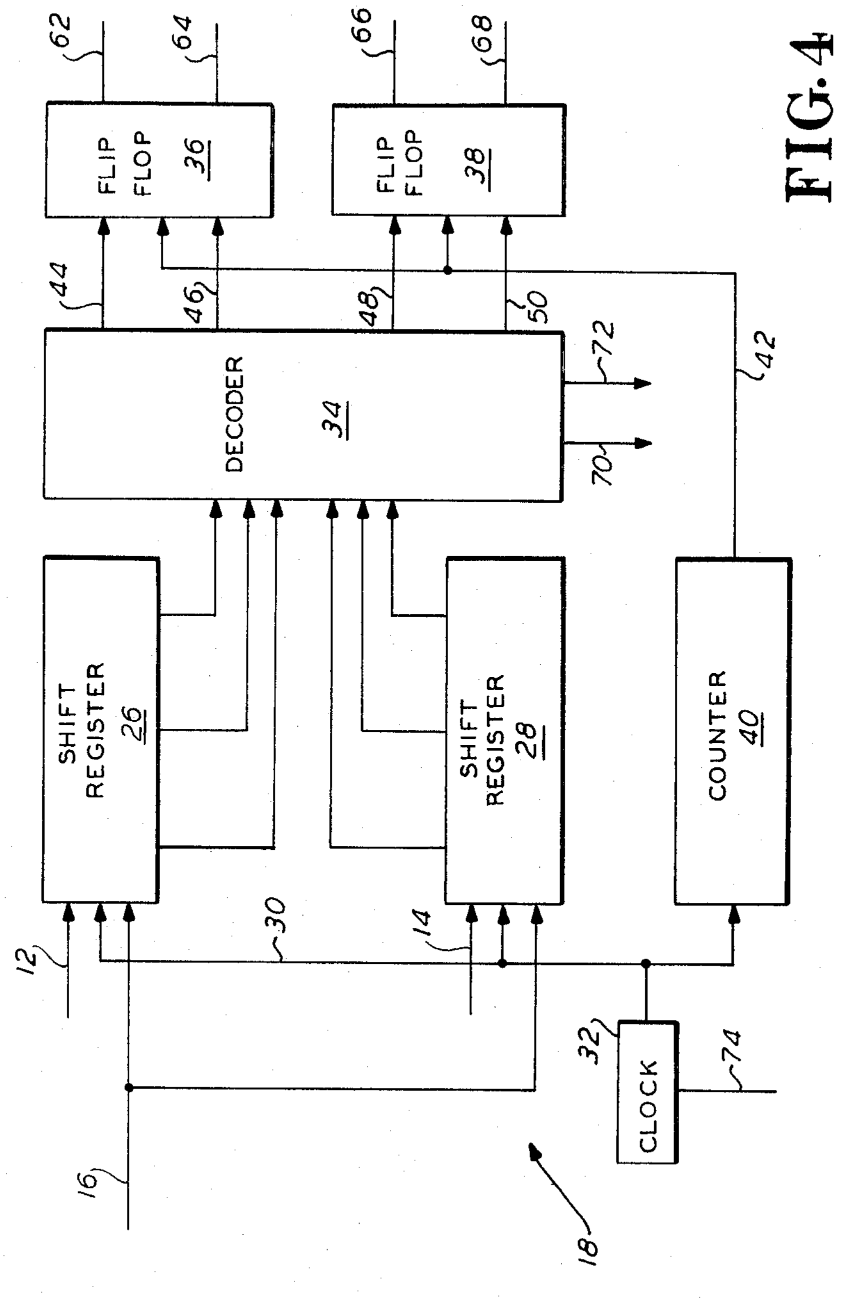
FIG. 4 shows in detail a mode of operation code detector for use in the system block diagram of FIG. 3.

The function of the mode of operation detector 18 is evident from FIG. 4. Lead 16 is connected to a 3-bit shift register 26 and to a 3-bit shift register 28. Shift register 26 has two additional inputs designated by lead 12 and a lead 30 which is connected to a clock pulse generator 32 which generates a pulse on lead 30 each time a code bar has been read. The two additional inputs of shift register 28 consist of lead 30 and lead 14. The three outputs of shift register 26 and the three outputs of shift register 28 are connected to a decoder 34 the four outputs of which being connected to bistable flip-flops 36 and 38 which also are connected to a 3-bit counter 40 via lead 42. The input of counter 40 receives clock pulses from generator 32.

Now, if the code according to FIG. 1 is read from the left to the right, reader 2 will generate a first signal which is transmitted to the time measuring unit 4 which indicates that a very long distance has been read, i.e. the distance before the first bar to the left in the mode of operation code B. Thereafter, unit 4 receives a second signal indicating that a distance which is at least approximately four times less than the distance before the first bar is present. Comparator 10 compares these two distances and emits a signal on the lead 16. This signal means that the second distance, i.e. the distance between the first and the second bar is short in relation to the first distance, i.e. the distance before the first bar. When the third bar is reached, unit 4 measures the distance between the second and the third bar whereafter comparator 10 compares this distance with the preceding distance (the distance between the first and the second bar), and the comparator emits a signal on lead 12 depending on the fact that the distance between the second and the third bar is approximately four times as long as the preceding distance. Thereafter, the next distance in the mode of operation code B is read and a signal is sent to detector 18 via lead 16.

The signal on lead 16, which represents the first distance in the mode of operation code B according to FIG. 1, is sent to shift registers 26 and 28 after a clock pulse which is generated by the first bar has been sent to these shift registers via lead 30. After a further clock pulse, indicating shift order has been generated, the signal representing the second distance in code B is sent to register 26. After three distances have been read, register 26 contains one 0-bit, one S-bit and one 0-bit while register 28 contains three 0-bits, and the 3-bit counter 40 which has counted to three emits a signal on lead 42. This signal initiates the decoder 34 to emit information representing the mode of operation code B to the bistable flip-flops 36 and 38. Since decoder 34 received one 0-bit, one S-bit and one 0-bit from shift register 26 and 0-bits from shift register 28, the decoder converts these bits to a signal on lead 44 and a signal on lead 48, these signals setting the bistable flip-flops to their 1-positions indicating that the mode of operation code B is a start code (signal on lead 48), which means that the information after the mode of operation code shall be read without a need to turn it right or reverse the data (i.e. the reading is performed from the left to the right), and also is a code which indicates to the code converter 52 in FIG. 3 that the code representing the information shall be read as a dependent code, i.e. the circuits in the code converter 52 will read the individual characters in the code as dependent. The outputs of flip-flops 36 and 38 are connected to code converter 52 via leads 62, 64, 66 and 68.

If the mode of operation code C in FIG. 2 has been read instead, a signal is obtained on lead 46 indicating that the code following after the mode of operation code shall be read as independent. A signal is also obtained on lead 48 indicating that the reading is performed from the left to the right. If the reading had been performed from the right to the left in FIG. 1, i.e. the mode of operation code E had been read first, signals are obtained on leads 44 and 50. This signal on lead 50 indicates that code converter 52 shall reverse the information in the code in order that the reading result shall be correct. If the mode of operation code D had been read first, signals are obtained on leads 46 and 50.

After any of mode of operation codes B, E, C or D has been read, the code coming after this mode of operation code will be converted to 0-bit and 1-bit signals which are sent to a 5-bit shift register 24 via leads 20 and 22. Of course, the mode of operation code detector 18 also receives these signals but they are not sent to the code converter since cancelling logical circuits (not shown) prevent counter 40 from emitting a signal on lead 42, if a mode of operation code including a preceding long distance has not been read.

The signals on leads 20 and 22 are received by shift register 24 which after five received signals, representing a character in the code, emits four of these signals to code converter 52 via leads 54, 56, 58 and 60. The fifth signal together with said four signals, is sent to a parity checking device (not shown) which emits a signal if a parity error has been introduced in the code.

The signals on leads 54, 56, 58 and 60 are BCD-coded, i.e. a signal on lead 54 designates an 8-bit, a signal on lead 56 designates a 4-bit, a signal on lead 58 designates a 2-bit and a signal on lead 60 designates a 1-bit, if the reading of the code is performed from the left to the right. If the condition is reversed, i.e. reading is performed from the right to the left, there will be a 1-bit on lead 54, a 2-bit on lead 56, etc.

Mode of operation code detector 18 emits a signal on lead 70 for checking purposes when the first mode of operation code (start code) has been read and emits a signal on lead 72 when the last mode of operation code (end code) has been read.

Figure 5:
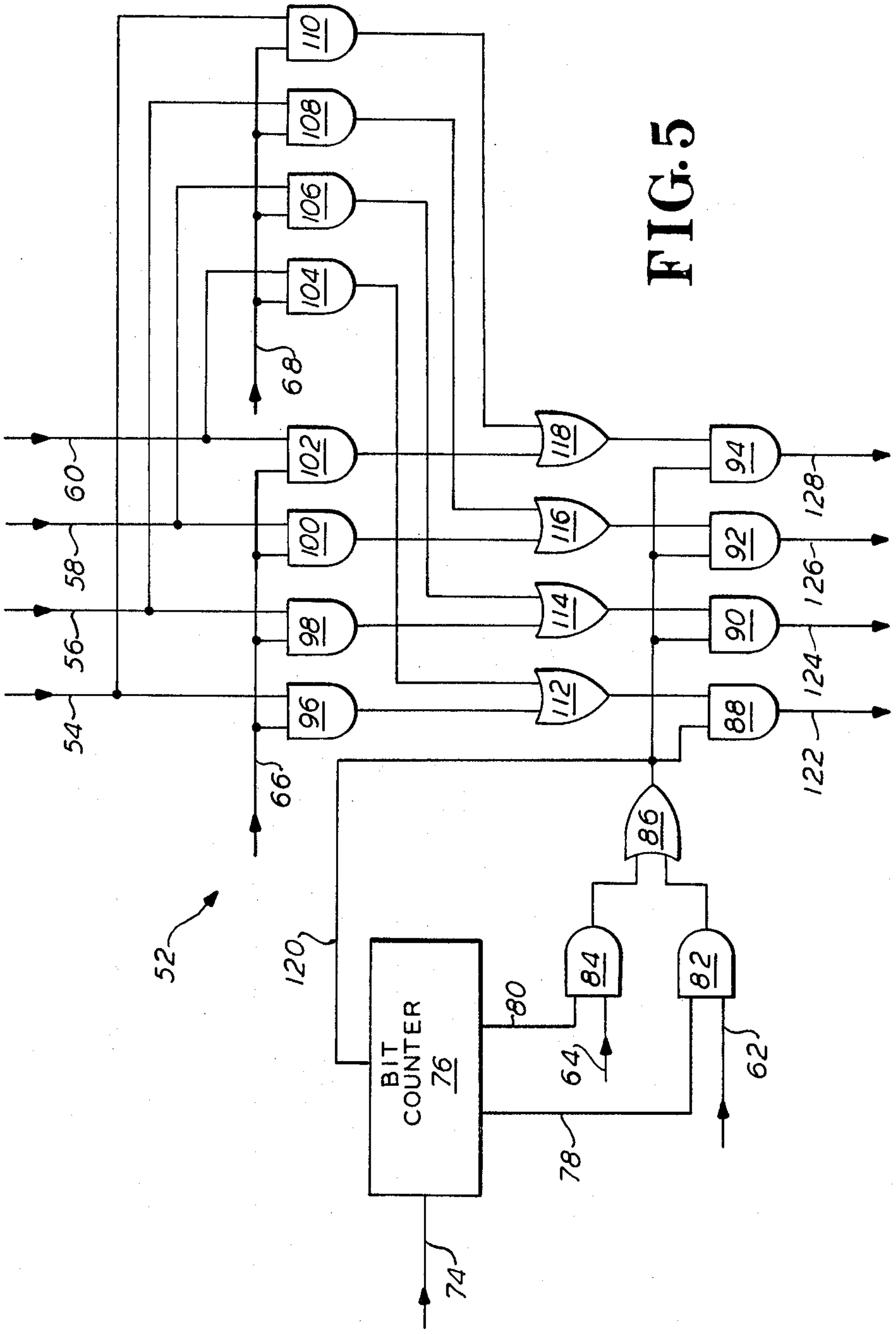
FIG. 5 shows in detail a code converter for use in the system of FIG. 3.

In FIG. 5, code converter 52 is shown in detail. A lead 74 connected to clock pulse generator 32 (see also FIG. 4) is connected to a bit counter 76 which emits a signal on its output 78 when bit counter 76 has counted five bits and emits a signal on its output 80 when it has counted six bits, i.e. output 78 receives a signal for each character in the code according to FIG. 1 while output 80 receives a signal for each character in the code according to FIG. 2. Lead 62, which, when a signal appears thereon, indicates that the code is a dependent code and thus contains five bits for each character, is connected to an AND gate 82 while lead 64, which, when a signal appears thereon, indicates that the code is an independent code and thus contains six bits for each character, is connected to an AND gate 84. To the other inputs of AND gates 82 and 84 the leads 78 and 80 are connected and to their outputs an OR gate 86 is connected, the output of which is connected to inputs of AND gates 88, 90, 92 and 94. Leads 54, 56, 58 and 60 are connected to inputs of four AND gates 96, 98, 100 and 102, the other inputs of which are connected to lead 66 and to an input of four AND gates 104, 106, 108 and 110, the other inputs of which being connected to lead 68. The outputs of AND gates 96–110 are connected to four OR gates 112, 114, 116 and 118, the outputs of which being connected to AND gates 88–94. A lead 120 between the output of OR gate 86 and counter 76 zeros the counter after it has counted to five or six.

When there is a signal on lead 62, indicating that the code is a dependent code, counter 76 counts to five and a signal is sent to AND gates 88–94. When there is a signal on lead 64, indicating that the code is independent, counter 76 counts to six and a signal is sent to AND gates 88–94. If the reading is performed from the left to the right, there is a signal on lead 66. If the reading, however, is performed from the right to the left, there is a signal on lead 68. If there is a signal on lead 66, one or more of AND gates 88—94 — via gates 96–102 and 112–118 will receive the signals on one or more of leads 54–60 whereby leads 122–128 will emit the true information in the code in binary form. If there is a signal on lead 68, ANd gates 104–110 works and the signals on leads 54–60, which are complementary if the reading is performed from the right to the left, are turned right before they are sent to leads 122–128 via gates 112– 118 and 88–94.

The signals on leads 122–128 can be sent to any data processing device which converts and/or processes the signals in any desirable manner.

The invention is not limited to the embodiment described above but is only limited to that which is stated in the appended claims. Thus, the code can consist of differently magnetised fields instead of bars and spaces between bars having different reflection properties as shown in FIGS. 1 and 2. A magnetic reading device is then necessary. Instead of the discrete devices shown in FIGs. 3–5, integrated logical circuits in a minicomputer or a similar device can be used. Moreover, the code representing the characters and the mode of operation code or codes can be designed in any other suitable manner.

What is claimed is:

1. Device for reading a data record attached to a salable article of merchandise, said data record having a code recorded thereon consisting of markings comprising a series of bars representing different characters, relative movement between a reading device and said data record causing said code to be read comprising:

a time measuring unit connected to the outputs of said reading device for emitting signals representing the spacing between said markings;

a comparator connected to said time measuring unit for comparing the signals generated by said time measuring unit and for emitting signals representative of the distance between adjacent bars in said markings according to a predetermined format;

said format comprising a first signal designating a first distance between two code bars; a second signal designating a distance twice as long as said first distance and a third signal designating a distance four times as long as said first distance;

a mode of operation detector connected to said comparator for receiving said first, second and third signals;

a converter connected to said mode of operation detector;

said mode of operation detector generating a signal indicative of whether the characters in the code are independent of each other and thus separated from each other an arbitrary distance or dependent on each other in such a manner that one marking forms the end of a character and the beginning of an adjacent character, said converter being arranged to convert said first, second and third signals to signals representing the different characters in the code.

2. Device as set forth in claim 1, wherein: said reader first reads one mode of operation code, then the code representing the different characters and thereafter one additional mode of operation code located on the other side of the code representing the different characters, the signals from the mode of operation codes having at least three different values and the signals from the code representing the different characters having at least two different values.

3. Device as set forth in claim 2, wherein:

said comparator emits said first and second signals to a shift register;

said shift register being connected to said converter;

said converter converting said signals from said shift register to signals representing the different characters in correspondence with the signals emitted from said mode of operation detector.

* * * * *

UNITED STATES PATENT OFFICE
CERTIFICATE OF CORRECTION

PATENT NO. : 3,869,598

DATED : March 4, 1975

INVENTOR(S) : Gosta R. Englund and Rune L. Myren

It is certified that error appears in the above-identified patent and that said Letters Patent are hereby corrected as shown below:

Column 2, line 10, insert after code --in order--

Column 4, line 22, delete "(" before the e

Column 4, line 44, insert after and --the white--

Column 7, line 16, the "d" in ANd should be "D"

Signed and Sealed this

First Day of February 1977

[SEAL]

*Attest:*

RUTH C. MASON
*Attesting Officer*

C. MARSHALL DANN
*Commissioner of Patents and Trademarks*